United States Patent [19]

Lienhard

[11] Patent Number: 4,847,365

[45] Date of Patent: Jul. 11, 1989

[54] METAL COMPLEXES OF SUBSTITUTED 4-(2-CARBOXY-PHENYLAZO-5-PYRAZOLONES

[75] Inventor: Paul Lienhard, Frenkendorf, Switzerland

[73] Assignee: Ciba-Geigy Corporation, Ardsley, N.Y.

[21] Appl. No.: 159,504

[22] Filed: Feb. 17, 1988

Related U.S. Application Data

[60] Division of Ser. No. 91,335, Aug. 31, 1987, abandoned, which is a continuation of Ser. No. 800,844, Nov. 22, 1985, abandoned.

[30] Foreign Application Priority Data

Nov. 30, 1984 [CH] Switzerland ............... 5711/84

[51] Int. Cl.$^4$ .............. C09B 45/14; C09B 45/18; C09B 45/20; C09B 45/22
[52] U.S. Cl. .................. 534/710; 534/575; 534/602; 534/753; 534/775; 534/795; 534/887
[58] Field of Search ......................... 534/710

[56] References Cited

U.S. PATENT DOCUMENTS 2,921,061  11/1960  Ackermann et al. ........... 534/710 X

FOREIGN PATENT DOCUMENTS 917632   9/1954  Fed. Rep. of Germany ...... 534/710
823393  11/1959  United Kingdom ................ 534/710
1021938  3/1966  United Kingdom ................ 534/710

OTHER PUBLICATIONS

Callis et al., J. Am. Chem. Soc., vol. 74, pp. 3461 to 3464, (1952).

A.P.C. Application of Mueller et al., Ser. No. 391,542, published Apr. 27, 1943.

R. Garvanska et al., God. Vissh, Khim-Tekhnol. Inst. Sofia, 21, 259, (1973)=(C.A. 85 178829u) (1976).

Primary Examiner—Floyd D. Higel
Attorney, Agent, or Firm—Luther A. R. Hall

[57] ABSTRACT

The invention relates to novel 1:1 metal complexes of a divalent transition metal and an azo compound of the formula (1)

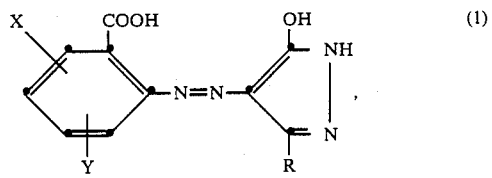

wherein
X is a hydrogen or a halogen atom, an alkyl, alkoxy, aryloxy, nitro, acylamino, ureido, arylureido, thioureido, thiocyano or sulfamoyl group or a phthalimido group which is unsubstituted or substituted by halogen atoms,
Y is a hydrogen or halogen atom, an alkyl or alkoxy group, and
R is an alkyl, alkoxycarbonyl, carbamoyl or alkylcarbamoyl group, or
wherein X and Y, together with two vicinal carbon atoms of the benzene ring, form a fused benzene or imidazolone ring.

These metal complexes, in particular the nickel and copper complexes, are suitable for the mass coloration of polymer fibres, especially polyolefins, polyamides or polyesters. The colored fibres have good fastness to heat, light and weather, as well as good rub- and wet-fastness properties.

5 Claims, No Drawings

METAL COMPLEXES OF SUBSTITUTED 4-(2-CARBOXY-PHENYLAZO-5-PYRAZOLONES

This is a divisional of application Ser. No. 091,335, filed on Aug. 31, 1987, now abandoned, which in turn is a continuation of application Ser. No. 800,844, filed on Nov. 22, 1985, now abandoned.

The present invention relates to novel 1:1 metal complexes of a divalent transition metal and an azo compound of the formula (1)

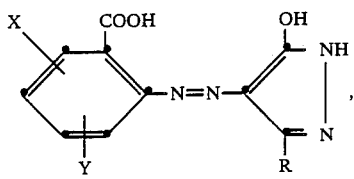

wherein

X is a hydrogen or a halogen atom, an alkyl, alkoxy, aryloxy, nitro, acylamino, ureido, arylureido, thioureido, thiocyano or sulfamoyl group or a phthalimido group which is unsubstituted or substituted by halogen atoms, Y is a hydrogen or halogen atom, an alkyl or alkoxy group, and R is an alkyl, alkoxycarbonyl, carbamoyl or alkylcarbamoyl group, or
wherein X and Y, together with two vicinal carbon atoms of the benzene ring, form a fused benzene or imidazolone ring.

Halogen atoms X, Y and R in formula (1) are preferably chlorine or bromine atoms.

Alkyl groups X, Y and R are preferably methyl, ethyl, n-propyl, isopropyl, n-butyl, isobutyl, tert-butyl or n-hexyl groups.

Alkoxy groups X and Y are preferably methoxy, ethoxy, propoxy, isopropoxy, n-butoxy, isobutoxy, tert-butoxy or n-hexyloxy groups.

An aryloxy group X may be an α-naphthoxy or β-naphthoxy group, a diphenylyloxy group or, preferably, a phenoxy group which is unsubstituted or substituted by halogen atoms, preferably chlorine atoms, or by $C_1$-$C_4$alkyl or $C_1$-$C_4$alkoxy groups, preferably methyl, methoxy or ethoxy groups.

An acylamino group X may be a formylamino group, a $C_2$-$C_6$alkanoylamino group, preferably an acetylamino or propionylamino group or a 1- or 2-naphthoylamino group or, most preferably, a benzoylamino group which is unsubstituted or substituted by halogen atoms, preferably chlorine atoms, or by $C_1$-$C_4$alkyl or $C_1$-$C_4$alkoxy groups, in particular methyl or methoxy groups.

An arylureido group X is preferably a phenylureido group which is unsubstituted or substituted by halogen atoms, preferably chloroine atoms, or by $C_1$-$C_4$alkyl or $C_1$-$C_4$alkoxy groups, in particular methyl or methoxy groups.

X as a halogen-substituted phthalimido group is preferably a dichloro- or tetrachlorophthalimido group.

An alkoxycarbonyl group R is preferably a $C_2$-$C_6$alkoxycarbonyl group, for example a carbomethoxy, carboethoxy, carbopropoxy or carbobutoxy group.

An alkylcarbamoyl group R is preferably a $C_2$-$C_6$alkylcarbamoyl group, for example a methylcarbamoyl, ethylcarbamoyl, n-propylcarbamoyl, isopropylcarbamoyl, n-butylcarbamoyl, isobutylcarbamoyl or tert-butylcarbamoyl group.

Suitable transition metals are in particular metal ions which carry two positive charges, for example $Ni^{2+}$, $Cu^{2+}$, $Co^{2+}$, $Zn^{2+}$, $Mn^{2+}$, $Fe^{2+}$, $Cd^{2+}$ and $Pt^{2+}$, preferably $Ni^{2+}$, $Cu^{2+}$, $Co^{2+}$ and $Zn^{2+}$, most preferably $Ni^{2+}$ and $Cu^{2+}$. Also suitable are mixtures of metal complexes, for example mixtures of Ni and Zn complexes or of Co and Zn complexes, or Ni complexes of mixtures of two azo compounds of formula (1).

Preferred metal complexes on account of their particular stability are those complexes of azo compounds of formula (1), whewrein X ia a hydrogen or halogen atom, a $C_1$-$C_4$alkyl or $C_1$-$C_4$alkoxy group, a nitro or $C_2$-$C_6$alkanoylamino group, a phenoxy, benzoylamino or phenylureido group, each of which is unsubstituted or substituted by chlorine atoms, $C_1$-$C_4$alkyl or $C_1$-$C_4$alkoxy groups, or is a ureido group, Y is a hydrogen or chlorine atom or a $C_1$-$C_4$alkyl or $C_1$-$C_4$alkoxy group, R is a $C_1$-$C_4$alkyl, carbamoyl, $C_2$-$C_6$alkylcarbamoyl or $C_2$-$C_6$alkoxycarbonyl group, and the metal is nickel, copper, cobalt or zinc.

Especially preferred, because they are particularly heat-stable, are metal complexes of azo compounds of formula (1), wherein X is a hydrogen or chlorine atom, a methyl, nitro, $C_2$-$C_5$alkanoylamino group, or a phenoxy or phenylcarbamoyl group, each unsubstituted or substituted by chlorine atoms or by $C_1$-$C_4$alkyl or $C_1$-$C_4$alkoxy groups, Y is a hydrogen or chlorine atom, R is a methyl group or a $C_2$-$C_3$alkoxycarbonyl group, and, in particular, those wherein X is a hydrogen atom, a chlorine atom which is para to the carboxyl group, or a phenoxy group which is para to the azo group, Y is a hydrogen atom, R is a methyl group, and the metal is nickel or copper.

The metal complexes of azo compounds of formula (1) are obtained by treating an azo compound of formula (1) with an agent that donates a divalent transition metal, preferably copper, zinc or nickel.

The azo compounds of formula (1) are obtained by coupling the diazo compound of an aminobenzoic acid of formula (2)

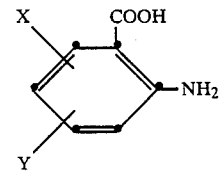

with a pyrazolone of formlua (3)

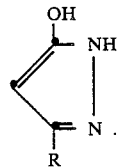

Typical examples of aminobenzoic acids of formula (2) are:
2-aminobenzoic acid,
2-amino-3-, -4-, -5- or -6-chlorobenzoic acid, 2-amino-4-methyl-5-acetylaminobenzoic acid,
2-amino-3-methoxy-6-chlorobenzoic acid,
2-amino-5-phthalimidobenzoic acid,
2-amino-3-ethylbenzoic acid,
2-amino-4-nitrobenzoic acid,
2-amino-5-nitrobenzoic acid,
2-amino-6-nitrobenzoic acid,
3-amino-5-acetylaminobenzoic acid,
2-amino-3-methylbenzoic acid,
2-amino-5-methylbenzoic acid,
2-amino-6-methylbenzoic acid,
2-amino-5-sulfamoylbenzoic acid,
2-amino-5-phenoxybenzoic acid,
2-amino-5-benzoylaminobenzoic acid,
2-amino-5-(4'-methoxyphenoxy)benzoic acid,
2-amino-5-(2',4'-dichlorophenoxy)benzoic acid,
2-amino-4-iodobenzoic acid,
2-amino-5-(3'-methylphenoxy)benzoic acid,
2-amino-5-formylaminobenzoic acid,
2-amino-5-popionylaminobenzoic acid,
2-amino-5-ureidobenzoic acid,
2-amino-5-(N-phenylureido)benzoic acid,
2-amino-3,5-dimethoxybenzoic acid,
2-amino-5-bromo-benzoic acid,
2-amino-4,5-dimethylbenzoic acid,
2-amino-5-thiocyanobenzoic acid,
2-amino-3-fluorobenzoic acid,
2-amino-3-nitro-5-methylbenzoic acid,
2-amino-3-naphthoic acid,
5-amino-6-carboxybenzimidazolone.

These aminobenzoic acids are known compounds or compounds which can be readily obtained by known methods.

Representative examples of pyrazolones of formula (3) are:
3-methyl-5-pyrazolone,
3-carboethoxy-5-pyrazolone,
3-carbomethoxy-5-pyrazolone,
3-carbamoyl-5-pyrazolone,
3-(N-methylcarbamoyl)-5-pyrazolone.

These are known compounds.

The diazotisation and coupling of the aminobenzoic acids to the pyrazolones is effected in known manner.

The corresponding metal salts such as the chlorides, sulfates, nitrates or acetates are used for the metallisation, for example the acetates, chlorides, sulfates, nitrates or phosphates of nickel, copper, cobalt or zinc. It is also possible to use the co-ordination compounds of the cited transition metals, for example nickel acetyl acetonate or copper tetraminosulfate. For this reaction, it is convenient to use organic solvents.

Examples of suitable solvents are: methanol, ethanol, butanol, ethylene glycol, ethylene glycol monomethyl ether, ethylene glycol monoethyl ether, dimethylformamide, nitrobenzene, dichlorobenzene, toluene and glacial acetic acid. Mixtures of organic solvents, of organic solvents with water, as well as water alone, may also be used.

The reaction proceeds at elevated temperature, preferably in the range from 50° C. to the boiling point of the solvent or solvent mixture employed.

The metal complexes so obtained can be readily isolated by filtration. Any impurities can be removed by washing off.

Depending on the nature of their substituents and of the polymer to be coloured, the metal complexes of the azo compounds of formula (1) are used as polymer-soluble colourants or, preferably, as pigments. In the latter case, it is advantageous to convert the products obtained in the synthesis into a finely dispersed form. This can be done by various means, for example by grinding or kneading, conveniently in the presence of grinding assistants such as inorganic or organic salts, with or without the addition of organic solvents. After grinding, the grinding assistants are removed in conventional manner, with soluble organic salts being removed e.g. with water and water-insoluble organic solvents e.g. by steam distillation.

It may be expedient to subject the metal complexes of the azo compounds of formula (1) to an aftertreatment with organic solvents, preferably with those having a boiling point above 100° C.

Particularly suitable solvents for this aftertreatment are benzenes which are substituted by halogen atoms, alkyl groups or nitro groups, for example xylenes, chlorobenzene, o-dichlorobenzene or nitrobenzene, as well as alcohols such as isopropanol or isobutanol, and also ketones such as cyclohexanone; ethers such as ethylene glycol monomethyl or monoethyl ether; amide such as dimethylformamide or N-methylpyrrolidone; and dimethylsulfoxide, sulfolane or water alone, at normal pressure or under pressure. The aftertreatment may also be carried out with water in the presence of organic solvents and/or with the addition of surface-active agents or aliphatic amines or in liquid ammonia.

The above-mentioned aftertreatments make it possible to control and optimise the metal complexes of the azo compounds of formula (1) with respect to their granular size and their pigment properties such as tinctorial strength, fastness to migration and light and weather resistance, as well as opacity or transparency.

Depending on the envisaged end use, it is advantageous to use thee pigments as toners or in the form of preparations.

The high molecular organic material to be coloured in the process of this invention may be of natural or synthetic origin. It may for example consist of natural resins or drying oils, rubber or casein, or of modified natural material such as chlorinated rubber, oilmodified alkyd resins, viscose, cellulose butyrate or nitrocellulose and, in particular, of the man-made organic polymers (duroplasts and thermoplasts) obtained by polymerisation, polycondensation or polyaddition. Typical representatives of the class of polymerisation resins are polyolefins such as polyethylene, polypropylene or polyisobutylene, and also substituted polyolefins such as polymers of vinyl chloride, vinyl acetate, styrene, acrylonitrile, of acrylates and/or methacrylates or butadiene, as well as copolymers of the aforementioned monomers, in particular ABS or EVA.

Representative examples of polyaddition resins and polycondensation resins are the condensates of formaldehyde with phenols (phenoplasts), and the condensates of formaldehyde with urea, thiourea and melamine (aminoplasts), the polyesters used as surface-coating resins, i.e. saturated resins such as alkyd resins as well as unsaturated resins such as maleic resins, and also linear polyesters and polyamides or silicones.

The above-mentioned high molecular compounds may be in the form of individual compounds or of mixtures, plastics materials or melts which can spun to filaments. They may also be in the form of their monomers or, in the polymerised state, in dissolved form as film formers or binders for varnishes or printing inks, e.g. linseed oil varnish, nitrocellulose, alkyd resins, melamine resins and urea/formaldehyde resins or acrylic resins.

The pigmenting of the high molecular organic compounds with the metal complexes of the azo compounds of formula (1) is carried out for example by incorporating such a pigment, optionally in the form of a masterbatch, into the substrates using roll mills, mixing or grinding machines. The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. In the process of this invention, the plasticisers may be incorporated before or after working the pigment dye into the polymer. To obtain different shades, it is also possible to add fillers or other chromophoric components such as white, coloured or black pigments, in any amount, to the high molecular organic compounds, in addition to the metal complexes of the azo dyes of formula (1).

Of particular importance is the use of the colorants of the present invention for the mass colouration of engineering plastics, for example those made of polyamides, polycarbonates, polyesters such as polybutyl terephthalate, or polymers or copolymers such as ABS. The colorants are also suitable for the mass colouration of polycondensate or polymer fibres such as polycaprolactam and, in particular, polyolefin fibres such as polypropylene fibres.

For pigmenting varnishes and printing inks, the high molecular organic materials and the metal complexes of the azo compounds of formula (1), optionally together with additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The metal complexes of the azo compounds of formula (1) are able to stabilise the polymers coloured with them against the effects of light and weather. This is particularly important whenever the coloured polymers, in particular, polypropylene, are processed to fibres.

If the metal complexes of this invention are incorporated into light-stabilised high molecular organic material, then the light stability is usually not impaired. A synergistic improvement in the light stability may also be observed.

The colourations preferably contain 0.01 to 20% by weight of the metal complex of an azo complex of formula (1), for example in plastics materials, fibres, varnishes and printing inks, and are distinguished by good dispersibility, fastness to overstripe bleeding, migration, heat, light and weather, good colour strength as well as by good gloss. Mass coloured filaments additionally have good wet- and rubfastness properties.

In the following Examples, parts and percentages are by weight unless otherwise stated.

EXAMPLE 1

26.8 g of 3-methyl-4-(2'-carboxyphenylazo)-5-pyrazolone, monosodium salt, are suspended in 1000 ml of ethanol. To this suspension are added 14.9 parts of nickel acetate tetrahydrate and the mixture is boiled under reflux for 4 hours. The reaction mixture is cooled to 40° C. and filtered. The filter product is washed with ethanol and dried in vacuo, affording 15 g of a brown powder. Analysis shows that this product contains, per molecule of azo compound, 1 atom of nickel and 1–2 molecules of water. One of the possible isomeric forms is:

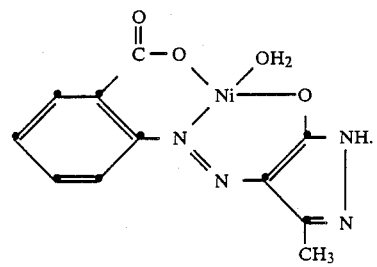

EXAMPLE 2

To a suspension of 24.6 g of 3-methyl-4-(2'-carboxyphenylazo)-5-pyrazolone in 1500 ml of water water are added 27.4 g of nickel acetate tetrahydrate and the mixture is stirred for 5 hours at 90°–95° C. The nickel complex is isolated hot by filtration, washed with water and dried in vacuo, affording 24 g of a brown pigment of the same constitution as that obtained in Example 1.

EXAMPLE 3

24.6 g of 3-methyl-4-(2'-carboxyphenylazo)-5-pyrazolone are suspended by 80°–85° C. in 250 ml of n-butanol and a solution of 27.4 g of nickel acetate tetrahydrate in 200 ml of water is added dropwise to this suspension. The mixture is boiled under reflux for 4 hours, cooled with stirring, and filtered. The filter cake is washed with water and n-butanol and dried in vacuo, affording 30 g of the 1:1 nickel complex.

EXAMPLE 4

A solution of 20 g of copper acetate hydrate in 400 ml of water is added dropwise to a hot solution of 24.6 g of 3-methyl-4-(2'-carboxyphenylazo)-5-pyrazoline in 1500 ml of water and 20 ml of 10N sodium hydroxide solution. The mixture is stirred for 5 hours at 90°–95° C., whereupon the product precipitates. The precipitate is isolated by filtration, washed with warm water and dried in vacuo, affording 27.5 g of a brown powder that contains, per molecule of azo compound, one atom of copper. The finely particulate pigment colours PVC yellow.

EXAMPLE 5

28.1 g of 3-methyl-4-(2'-carboxy-5'-chlorophenylazo)-5-pyrazolone are dissolved hot in 1600 ml of water and 10 ml of 10N sodium hydroxide solution. A solution of 27.4 g of nickel acetate tetrahydrate in 300 ml of water is added dropwise to the above solution and the mixture is stirred for 4 hours at 90°–95° C. The precipitated 1:1 nickel complex of the azo compound is isolated by filtration, washed with water and dried in vacuo. Yield: 33 g. The finely particulate pigment colours PVC yellow.

EXAMPLE 6

To a suspension of 29.6 g of 3-methyl-4-(3'-carboxy-2'-naphthylazo)-5-pyrazolone in 350 ml of ethyl cellosolve of 100° C. are added 27.4 g of nickel acetate tetrahydrate and a further 150 ml of ethyl cellosolve. The mixture is stirred for 2 hours at 100°-105° C. and for 1 hour at 120°-125° C., and then filtered at 100° C. The filter cake is washed first with 70 ml of ethyl cellosolve and then with 300 ml of water and dried in vacuo, affording 39 g of the 1:1 nickel complex of the azo compound. The compound contains 8.5 % of water. The finely particulate pigment gives yellowish orange colorations in PVC and varnishes.

EXAMPLE 7

1.93 g of 5-amino-6-carboxybenzimidazolone are dissolved in 50 ml of glacial acetic acid and this solution is 2.7 ml of 10N hydrochloric acid and this solution is diazotised with 2.7 ml of 4N sodium nitrate solution. The resultant solution of the diazonium compound is added dropwise to a cold solution of 1 g of 3 methyl-5-pyrazolone in 150 ml of water and 2 ml of 10N sodium hydroxide solution and the coupling is brought to completion at pH 4–5. The azo compound is isolated by filtration and dissolved in hot water and converted into the 1:1 nickel complex with a stoichiometric amount of nickel acetate tetrahydrate. Shade in PVC: yellow.

EXAMPLES 8-24

Following the procedures described in Examples 1 to 6, productive fast pigments are also obtained by reacting an azo compound of formula (4) in Table 1 with a metal salt to give the 1:1 metal complex (M in column 4). Column 5 indicates the shade obtained in PVC.

TABLE 1

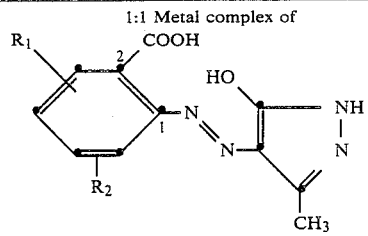

1:1 Metal complex of (4)

| Example Nr. | $R_1$ | $R_2$ | M | Shade in PVC |
|---|---|---|---|---|
| 8 | 5-Cl | H | Cu | yellow |
| 9 | 4-Cl | 6-Cl | Cu | yellow |
| 10 | 4-Cl | 6-Cl | Ni | yellow |
| 11 | 4-$NO_2$ | H | Cu | yellowish brown |
| 12 | 4-$NO_2$ | H | Ni | orange |
| 13 | 5-$NO_2$ | H | Cu | yellow |
| 14 | 5-$NO_2$ | H | Ni | yellowish orange |
| 15 | 4-$NHCOCH_3$ | H | Cu | brown |
| 16 | 4-$NHCOCH_3$ | H | Ni | yellowish orange |
| 17 | 4-$SO_2NH_2$ | H | Cu | yellow |
| 18 | 4-$SO_2NH_2$ | H | Ni | yellow |
| 19 | 4-$OC_6H_5$ | H | Cu | yellowish brown |
| 20 | 4-$OC_6H_5$ | H | Ni | yellow |
| 21 | 4-Cl | H | Cu | yellowish brown |
| 22 | 4-Cl | H | Ni | yellowish orange |
| 23 | 4-$NHCOC_6H_5$ | H | Cu | brown |
| 24 | 4-$NHCOC_6H_5$ | H | Ni | yellowish orange |

EXAMPLE 25

26.8 g of 3-methyl-4-(2'-carboxyphenylazo)-5-pyrazolone, monosodium salt, are suspended in 300 ml of butanol and to this solution is added a solution of 27.4 g of cobalt(II) acetate tetrahydrate in 300 ml of water. The mixture is boiled under reflux for 3 hours, cooled, and filtered. The filter cake is washed with n-butanol, then with water, and dried in vacuo. Yield: 27.6 g. After it has been ground, the product colours PVC and vanishes in yellowish orange shades of very good fastness to migration and light.

EXAMPLE 26

The procedure of Example 25 is repeated, replacing the cobalt acetate by an equimolar amount of zinc acetate, to give 29 g of a pigment which colours PVC and varnishes in pure yellow shades.

EXAMPLE 27

A solution of 6.86 g of 2-carboxyaniline and 8.58 g of 2-carboxy-4-chloroaniline in 30 ml of 10N HCl and water is diazotised at 0°–5° C. with 6.9 g of sodium nitrite. A solution of 10.36 g of 3-methyl-5-pyrazolone in 11 ml of 10N NaOH and water is added dropwise and the mixture is adjusted to pH 4–5 with sodium acetate. The yellow azo compounds so obtained are isolated by filtration, washed with water and then suspended in water. An aqueous solution of 24.9 g of nickel acetate tetrahydrate is added and the mixture is stirred for several hours at 90°–95° C. and then filtered. The filter cake is washed with water and dried in vacuo. Even after a short time it colours PVC and varnishes in yellow shades of excellent tinctorial strength.

EXAMPLE 28

A valuable pigment is likewise obtained by following the procedure of Example 27, but starting from 12.34 g of 2-carboxyaniline and 1.72 g of carboxy-4-chloroaniline.

EXAMPLES 29-64

Yellow to orange brown pigments are also obtained from the pigments of Table 2. These are 1:1 metal complexes (metal of column M) of azo compounds of formula (5) containing the substituents $R_1$-$R_3$ indicated in Table 2.

TABLE 2

Metal complexes of (structure 5: benzene ring with R₁, 2-COOH, R₂ substituents, azo-linked to pyrazolone with OH, NH, N, R₃)

| Example | R₁ | R₂ | R₃ | M |
|---|---|---|---|---|
| 29 | 4-Cl | H | CH₃ | Zn |
| 30 | 4-Cl | H | CH₃ | Co |
| 31 | 4-Br | H | CH₃ | Cu |
| 32 | 4-Br | H | CH₃ | Ni |
| 33 | 6-F | H | CH₃ | Ni |
| 34 | 5-Cl | 6-Cl | CH₃ | Ni |
| 35 | 6-Cl | H | CH₃ | Cu |
| 36 | 3-Cl | 6-OCH₃ | CH₃ | Ni |
| 37 | 4-OCH₃ | H | CH₃ | Ni |
| 38 | 3-CH₃ | H | COOC₂H₅ | Ni |
| 39 | 4-CH₃ | H | COOC₂H₅ | Ni |
| 40 | 6-CH₃ | H | COOC₂H₅ | Ni |
| 41 | H | H | COOC₂H₅ | Cu |
| 42 | H | H | COOC₂H₅ | Ni |
| 43 | H | H | CONH₂ | Cu |
| 44 | H | H | CONH₂ | Ni |
| 45 | 6-C₂H₅ | H | CONH₂ | Ni |
| 46 | 4-OCH₃ | 6-OCH₃ | CONH₂ | Ni |
| 47 | 3-COOC₂H₅ | H | CONH₂ | Ni |
| 48 | H | H | CONHCH₃ | Ni |
| 49 | H | H | CONHCH₃ | Cu |
| 50 | H | H | CONH—n-C₄H₉ | Ni |
| 51 | 4-NHCOCH₃ | H | CH₃ | Ni |
| 52 | 4-NHCOCH₃ | 5-CH₃ | CH₃ | Ni |
| 53 | 4-NHCOC₂H₅ | H | CH₃ | Ni |
| 54 | 4-NHCOC₂H₅ | H | CH₃ | Cu |
| 55 | 4-NHCHO | H | CH₃ | Ni |
| 56 | 4-NHCONH₂ | H | CH₃ | Ni |
| 57 | 4-NHCONHC₆H₅ | H | CH₃ | Ni |
| 58 | 4-SCN | H | CH₃ | Ni |
| 59 | 3-NO₂ | H | CH₃ | Ni |
| 60 | 4-CH₃ | 6-NO₂ | CH₃ | Ni |
| 61 | 4-CH₃ | 5-CH₃ | CH₃ | Ni |
| 62 | 4-O-(dichlorophenyl) | H | CH₃ | Ni |
| 63 | 4-N-(phthalimido) | H | CH₃ | Ni |
| 64 | 4-N-(tetrachlorophthalimido) | H | CH₃ | Ni |

EXAMPLE 65

65 g of stabilised polyvinyl chloride, 35 g of dioctyl phthalate and 0.2 g of the finely particulate nickel complex prepared according to Example 1 are stirred together and rolled for 7 minutes at 160° C. on a two-roll calender to produce a yellow sheet of very good fastness to light and migration.

Preparation of the finely particulate nickel complex: 25 g of nickel complex, 100 g of finely ground sodium chloride and 30 g of diacetone alcohol are kneaded together for 5 hours, with cooling, in a laboratory kneader. The mixture is added to 4000 ml of water and the resultant suspension is filtered. The isolated pigment is washed with water and dried in vacuo at 80° C.

EXAMPLE 66

10 g of titanium dioxide and 2 g of the nickel complex obtained in Example 1 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminum sheet, predried for 30 minutes at room temperature, and then stoved for 30 minutes at 120° C. A yellow finish of good colour strength and of very good fastness to overspraying, light, and atmospheric influences is obtained.

EXAMPLE 67

4 g of the finely particulate pigment of Example 1 are stirred into 20 parts of solvent of the following composition: 50 parts of Solvesso 150 ® (mixture of aromatic hydrocarbons), 15 parts of butylacetate, 5 parts of Exkin II ® (ketoxime-based levelling agent), 25 parts of methyl isobutyl ketone, 5 parts of silicone oil (1% in Solvesso 150). After complete dispersion has been attained (in about 15–60 minutes, depending on the type of stirrer), the binders are added, namely 48.3 parts of Baycryl L 530 ® (acrylic resin; 51% in xylene/butanol 3:1) and 23.7 parts of Maprenal TTX ® (melamine resin; 55% in butanol).

The batch is briefly homogenised and the resultant lacquer is then applied by conventional methods, such as spraying or dipping or—particularly for the continuous coating of sheet metal—by the coil-coating method, and stoved (30 minutes at 130° C.). The yellow finishes obtained are distinguished by very good levelness, high gloss and excellent dispersion of the pigment, as well as by good fastness to atmospheric influences.

EXAMPLE 68

2 g of the nickel complex of Example 1 are ground with 36 g alumina hydrate, 60 g of linseed oil varnish of medium viscosity and 2 g of cobalt linoleate on a three-roll mill. The yellow prints obtained with the resultant printing paste are strong and lightfast.

EXAMPLE 69

Polypropylene granules suitable for fibre production are thoroughly mixed with 2.5% of a pigment preparation containing 40% of the nickel complex of Example 1. The mixture is spun to fibres at 240°–260° C. by melt extrusion and subsequently stretched and wound in the ratio 1:4 on a draw twister. The deep yellow coloration so obtained has good fastness to light, washing, dry cleaning, gas fading and peroxide bleaching. Very fast yellow colorations are also obtained by repeating the procedure using polycaprolactam or polyethylene terephthalate granules instead of polypropylene granules and spinning the mixture to fibres at 260°–290° C.

The pigment preparation used in this Example is prepared as follows:

40 g of the yellow pigment, 60 g of magnesium behenate and 500 g of sodium chloride are thoroughly mixed in a powder mixer. The resultant mixture is processed at 130° C. in a laboratory kneader and the preparation so obtained is ground with water, filtered, washed free of salt, dried and pulverised.

EXAMPLE 70

4 g of the ground nickel complex of Example 1 and 76 g of a varnish composition consisting of 41.3% of a 60% solution of a heat-curable polyacrylate (Viacryl VC 373 ®, ex Vianova, Austria) in xylene, 16.3% of a 55% solution of a melamine resin (Maprenal TTX ®, ex Casella Farbwerke AG, West Germany) in butanol, 32.8% of xylene, 4.6% of ethyl glycol acetate, 2% of cyclohexanone, 2% of butyl acetate and 1% of a 1% solution of silicone oil in xylene are dispersed for 72 hours in a ball mill.

8 g of this mixture and 20 g of a 2% dispersion of aluminium in paraffin and xylene are thoroughly mixed and sprayed uniformly onto metal. This coating is predried for 30 minutes and then stoved for 30 minutes at 120°–130° C. The strong yellow coloration so obtained has very good resistance to weathering.

What is claimed is:

1. A 1:1 nickel, copper, cobalt(II) or zinc complex or mixtures thereof of an azo compound of the formula

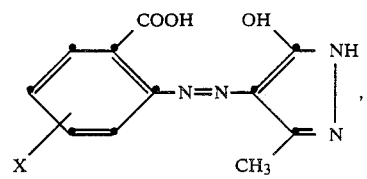

wherein X is hydrogen, chlorine, methyl, nitro, $C_2$–$C_6$-alkanoylamino, phenoxy or phenylcarbamoyl.

2. A 1:1 nickel complex according to claim 1, wherein X is hydrogen, chlorine which is para to the carboxyl or phenoxy which is para to the azo group.

3. A 1:1 nickel complex according to claim 1 of an azo compound of the formula

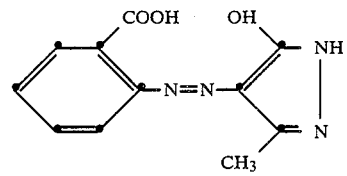

4. A 1:1 nickel complex according to claim 1 of an azo compound of the formula

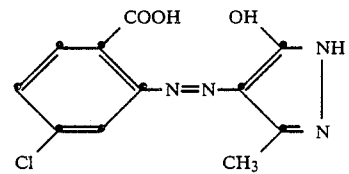

5. A 1:1 nickel complex according to claim 1 of an azo compound of the formula

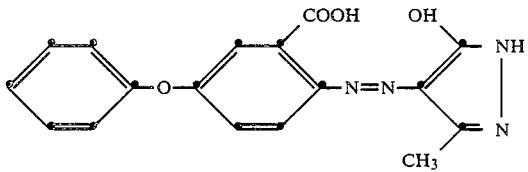

* * * * *